I. D. BRIM.
FRONT TRUCK FOR PLANTERS, &c.
APPLICATION FILED NOV. 27, 1909.

959,302.

Patented May 24, 1910.

2 SHEETS—SHEET 1.

Witnesses
Horace H. Lybrand
Wm. Bagger

Inventor
Isaac D. Brim
By Victor J. Evans
Attorney

I. D. BRIM.
FRONT TRUCK FOR PLANTERS, &c.
APPLICATION FILED NOV. 27, 1909.

959,302.

Patented May 24, 1910.
2 SHEETS—SHEET 2.

Witnesses
Horace H. Lybrand
Wm. Bagger

Inventor
Isaac D. Brim
By Victor J. Evans
Attorney

UNITED STATES PATENT OFFICE.

ISAAC D. BRIM, OF CAPS, TEXAS.

FRONT TRUCK FOR PLANTERS, &c.

959,302.  Specification of Letters Patent.  Patented May 24, 1910.

Application filed November 27, 1909. Serial No. 530,121.

*To all whom it may concern:*

Be it known that I, ISAAC D. BRIM, a citizen of the United States of America, residing at Caps, in the county of Taylor and State of Texas, have invented new and useful Improvements in Front Trucks for Planters, &c., of which the following is a specification.

This invention relates to front trucks or fore carriages for agricultural machines, such as planters of various kinds, such front trucks being utilized for the purpose of dispensing with the tongue usually employed and providing means whereby the machine equipped with such truck may be steered and guided by the operator.

The invention has for its object to provide a steering truck of simple and improved construction which may be conveniently applied to and used in connection with machines of various kinds and makes.

A further object of the invention is to provide improved means for connecting the wheel-carrying axles with the base of the truck.

A still further object of the invention is to provide simple and improved means for supporting the tongue extension and the draft attachment.

Still further objects of the invention are to simplify and improve the general construction and operation of a device of the character outlined above.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

Figure 1:
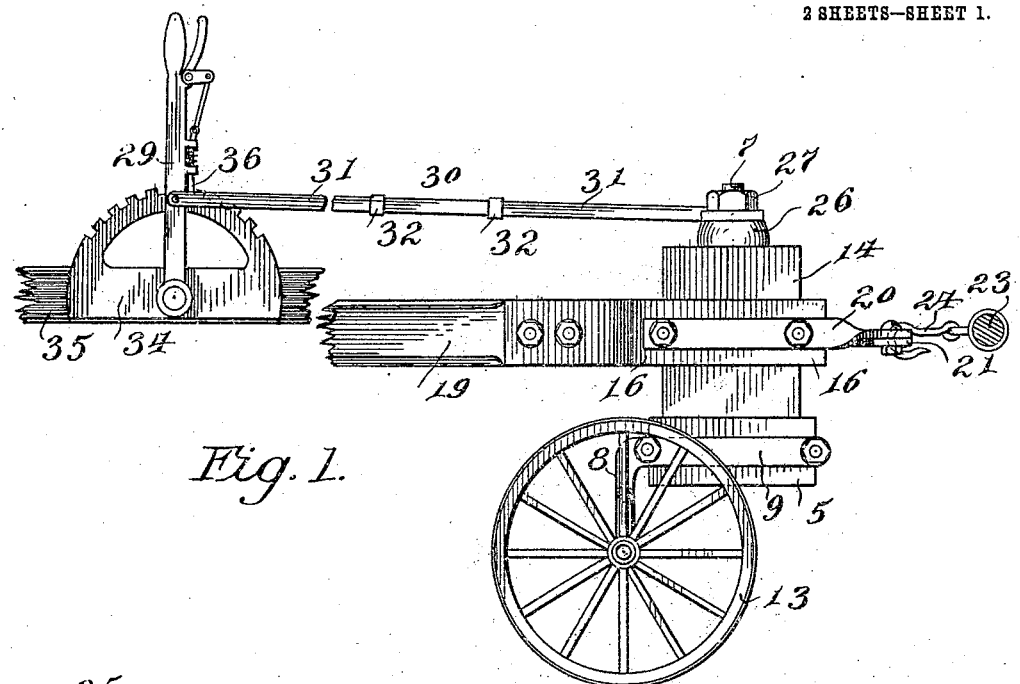
Figure 2:
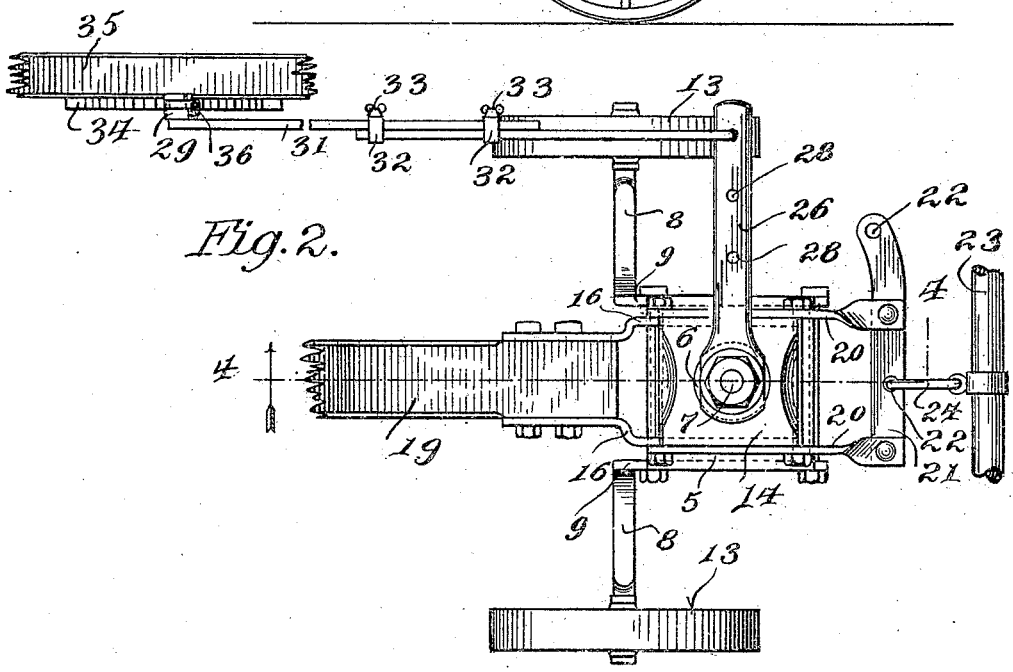
Figure 3:
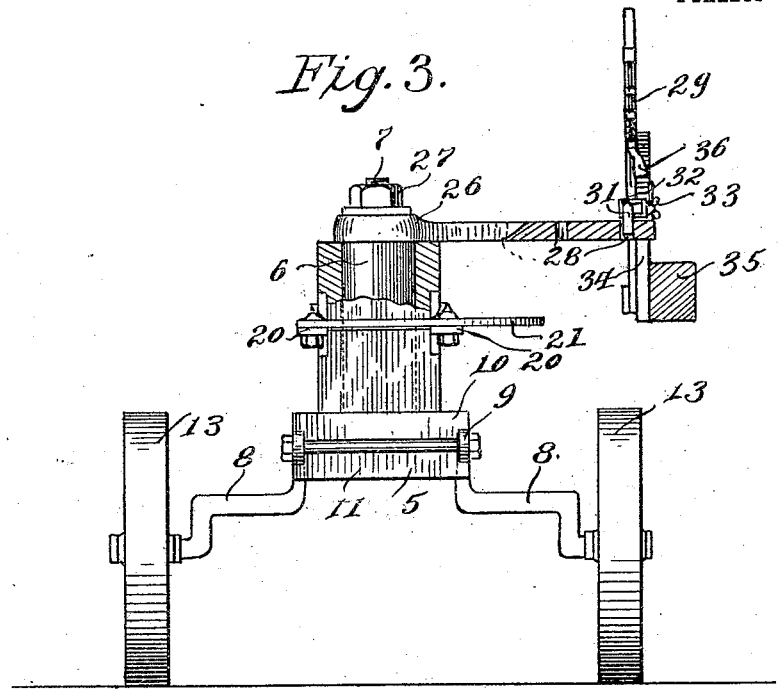
Figure 4:
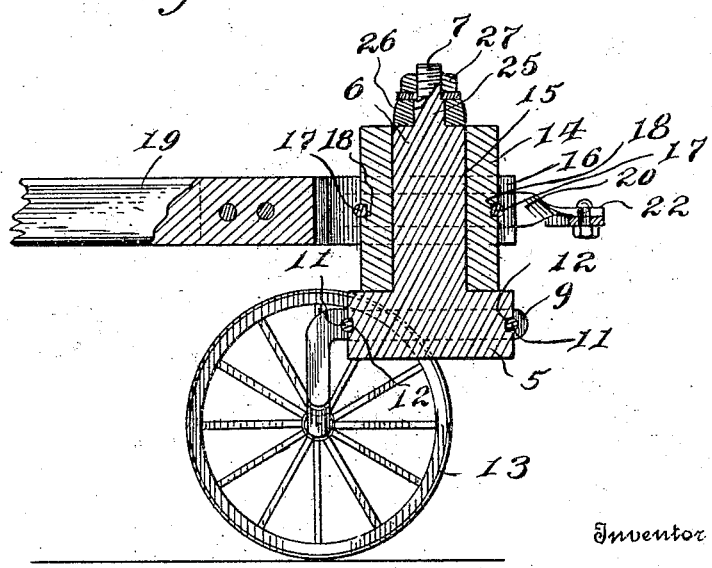

In the drawings,—Figure 1 is a side elevation of a planter truck constructed in accordance with the invention. Fig. 2 is a top plan view of the same. Fig. 3 is a front elevation, parts having been broken away for the purpose of exposing the subjacent construction. Fig. 4 is a longitudinal vertical sectional view taken on the line 4—4 in Fig. 2.

Corresponding parts in the several figures are denoted by like characters of reference.

The base 5 of the improved truck is formed with a cylindrical upward extension which, for convenience, may be designated as the king bolt 6, said king bolt being provided with an upwardly extending nipple 7 which is externally threaded, as shown. The crank axles 8 are provided with rearwardly extending arms 9 which are seated in recesses or grooves 10 in the sides of the base 5, said arms being connected by bolts 11 for the accommodation of which grooves 12 are formed in the front and rear walls of the base, as will be clearly seen in Fig. 4. In this manner the axles carrying the wheels 13 are very firmly and securely connected with the base of the truck.

A block 14 having a vertical bore 15 is supported for rotation upon the cylindrical extension or king bolt 6, and cheek plates 16 are securely mounted upon the sides of said block by means of transverse bolts 17 for the accommodation of which grooves 18 are formed in the front and rear faces of the block 14. Firmly secured between the rearwardly extending ends of the cheek plates 16 is the tongue extension 19, the rear end of which may be suitably connected with the frame of the machine in connection with which the truck is to be employed. Bolted or otherwise secured exteriorly upon the cheek plates 16 are forwardly extending straps 20, the front ends of which are connected by a draft bar 21 having a plurality of apertures 22 for the attachment of the equalizer 23 by means of a clevis 24. Two or more draft animals may be hitched to the equalizer, as may be desired. The nipple 7 which extends upwardly from the king bolt has a non-circular portion 25 upon which a lever 26 is securely mounted, said lever being firmly secured by means of a nut 27 threaded upon the nipple. The lever 26 is provided with a plurality of apertures 28 at varying distances from its fulcrum, and said lever is connected with a hand lever or adjusting lever 29 by means of an extension link 30 composed of two members 31 which are adjustably connected together by means of sleeves or collars 32 having set screws 33 or in any other suitable and convenient manner. The hand lever 29 is fulcrumed upon a segment rack 34, which latter is supported upon the frame of the machine in connection with which the truck is employed, a portion of said frame being shown at 35. It is obvious that the presence of the extension link 30 enables the segment rack to be mounted at varying distances from the lever 26. The hand lever 29 is provided with a spring-actuated stop member 36 of ordinary construction engaging the segment rack for the purpose of holding the parts securely in adjusted position.

The operation and advantages of this invention will be readily understood from the foregoing description taken in connection with the drawings hereto annexed by those skilled in the art to which it appertains. The tongue extension 19 is to be suitably connected with the frame of the machine in connection with which the device is to be used, as previously described, and it will be readily seen that by means of the hand lever 29 the lever 26 connected with the king bolt rising from the base may be adjusted, thus turning the base to present the wheels 13 in the direction in which it is desired to guide the machine. The draft animals will not be depended upon for guidance, and irregularities resulting from uneven movement of the draft animals will thus be avoided.

The construction of the improved device is simple, and it is found to be thoroughly efficient for the purposes for which it is intended.

Having thus described the invention, what is claimed as new is,—

1. In a device of the character described, a base, wheel carrying crank axles connected therewith, a king bolt rising from the base and having an upwardly extending partially threaded nipple provided with a non-circular portion, a block member supported for rotation upon the king bolt, a tongue extension connected with said block member, draft attaching means connected with the block member, a lever seated upon the non-circular portion of the nipple extending from the king bolt, and means for manipulating said lever to oscillate the king bolt and related parts.

2. In a device of the character described, a wheel carrying base having an upward extension constituting a king bolt, a block member seated for rotation upon the king bolt, a tongue extension and draft attaching means connected with the block member, a lever securely connected with the king bolt, a suitably supported segment rack, a hand lever fulcrumed upon the same, and an adjustable extension link connecting said hand lever with the lever mounted upon the king bolt.

In testimony whereof I affix my signature in presence of two witnesses.

ISAAC D. BRIM.

Witnesses:
M. C. LAMBETH,
C. S. HACHER.